United States Patent

Commerford, Jr. et al.

[11] Patent Number: 6,105,031
[45] Date of Patent: Aug. 15, 2000

[54] SYSTEM FOR REAL-TIME DEVICE DATA MANAGEMENT

[75] Inventors: Gerard Lawrence Commerford, Jr.; Daniel E. Cowan; Mark B. Turner, all of Colorado Springs, Colo.

[73] Assignee: MCI Communications Corporation, Washington, D.C.

[21] Appl. No.: 09/224,492

[22] Filed: Dec. 31, 1998

Related U.S. Application Data

[62] Division of application No. 08/777,464, Dec. 30, 1996, Pat. No. 5,909,682.

[51] Int. Cl.[7] .................................................. G06F 15/173
[52] U.S. Cl. ............................... 707/10; 707/9; 707/102; 395/200.33; 395/200.45; 395/200.49
[58] Field of Search .................................. 707/10, 9, 100, 707/102; 395/200.33, 200.4, 200.49, 200.59, 200.55, 200.45

[56] References Cited

U.S. PATENT DOCUMENTS

| | | | |
|---|---|---|---|
| 5,239,544 | 8/1993 | Balzano et al. | 370/465 |
| 5,394,402 | 2/1995 | Ross | 370/402 |
| 5,579,384 | 11/1996 | Seymour | 379/243 |
| 5,659,604 | 8/1997 | Beckmann | 379/220 |
| 5,684,954 | 11/1997 | Kaiserswerth et al. | 709/236 |
| 5,740,171 | 4/1998 | Mazzola et al. | 370/392 |
| 5,764,636 | 6/1998 | Edsall | 370/401 |
| 5,878,232 | 3/1999 | Marimuthu | 709/249 |

*Primary Examiner*—Jean R. Homere

[57] ABSTRACT

A real-time device data management (RTNDD) system for managing access to data describing devices in a telecommunications network. The RTNDD system maintains a partition data structure for each device. The partition data structure has a header section and a port data section. The header section contains data elements describing the device (e.g., number of ports and device type). The port data section has a port data structure for each port of the device that contains data elements describing the port (e.g., current cross-connect and actual port address for device). The RTNDD system also provides a standard interface through which external systems access the device data. The standard interface has functions for reading and writing to the partition data structures. Each read function reads multiple data elements of a header section or a port data structure at a time, and each write function writes a single data element of a device at a time. The standard interface is device independent such that an external system can use the standard interface to access device data for any type of device whose data is stored in a partition data structure.

6 Claims, 5 Drawing Sheets

SYSTEM FOR REAL-TIME DEVICE DATA MANAGEMENT

CROSS-REFERENCE TO RELATED APPLICATIONS

This patent application is a Divisional Application of U.S. patent application Ser. No. 08/777,464 filed on Dec. 30, 1996, now U.S. Pat. No. 5,909,682.

TECHNICAL FIELD

The preferred invention is related generally to communication networks and, in particular, to the storing of data to describe the network.

BACKGROUND OF THE INVENTION

In the telecommunications field, telecommunications carriers (e.g., long distance providers) continually strive to increase the reliability of their telecommunications networks. A telecommunications network consists of a collection of network nodes interconnected via transmission lines. Traffic is transmitted on the network from one endpoint to another endpoint through a current route, which is a network path that specifies the transmission lines that interconnect the endpoints. The main path (i.e., trunk) through the network is referred to as the original route. The network nodes may serve a variety of functions such as amplifying the network traffic for transmission down the next transmission line in the route or establishing an interconnection between two transmission lines connected to the node (i.e., a switch). Unfortunately, the components (e.g., nodes and transmission lines) of the transmission network may occasionally fail. For example, a transmission line that is a buried fiber optic cable may fail as a result of being inadvertently severed by someone digging near the buried cable.

If one or more of the cables fail, massive disruption of services to a large number of network customers could result. Therefore, telecommunications carriers strive to quickly and economically route the network traffic around such failed components by establishing a "restoral" route. A restoral route is a portion of a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers.

Telecommunications carriers typically develop "pre-planned" restoral routes that are used when various components fail. The development of such pre-planned restoral routes has several disadvantages. One disadvantage is that the amount of time needed to develop the restoral route for the network can increase exponentially with the size of the network. To develop the restoral routes, a telecommunications carrier typically collects large amounts of data relating to the telecommunications network. This data can include the topology of the network, speed of network components, and relative costs of the network components. A network analyst then analyzes the collected data and identifies the pre-planned restoral routes that would result in minimal impact on network customers both in terms of cost and service. The analyst typically needs to identify a pre-planned restoral route for each component that could possibly fail. A second disadvantage is that the pre-planned restoral routes cannot realistically take into consideration every possible combination of component failures. Thus, the pre-planned restoral routes may not be an optimal restoral route given the combination of failures that have occurred. A third disadvantage is that the pre-planned restoral routes cannot adjust to the dynamic nature of the network. The topology of a telecommunication network can be dynamic, that is components can be added, removed, and changed frequently. Therefore, these pre-planned restoral routes may fail because they were developed from outdated data. Consequently, each time the topology changes new pre-planned restoral routes may need to be developed.

Because of the disadvantages of the pre-planned restoral route, it would be desirable to identify a restoral route in real-time when a network failure is detected. In this way, the restoral route could be optimized based on the current network configuration. However, the identifying of such restoral routes in real-time has been impracticable for several reasons. First, vast amounts of information need to be culled and processed to even determine the current configuration of the network. Second, such vast amounts of information have been typically stored using database systems that provide only relatively slow access. Third, because a network can have many different types of devices with very different characteristics, the computer programs that access the data representing these characteristics can be very complex and inefficient. Moreover, if a new type of device were added to the network, then the computer programs would need to be modified to accommodate the new type of device.

SUMMARY OF THE INVENTION

The present invention provides a Real-Time Device Data Management (RTNDD) system for managing access to data describing devices in a telecommunications network. The RTNDD system maintains a partition data structure for each device. The partition data structure has a header section and a port data section. The header section contains data elements describing the device (e.g., number of ports and device type). The port data section has a port data structure for each port of the device that contains data elements describing the port (e.g., current cross-connect and actual port address for device). The RTNDD system also provides a standard interface through which external systems access the device data. The standard interface has functions for reading and writing to the partition data structures. Each read function reads multiple data elements of a header section or a port data structure at a time, and each write function writes a single data element of a device at a time. The standard interface is device independent such that an external system can use the standard interface to access device data for any type of device whose data is stored in a partition data structure.

The RTNDD system also synchronizes access to the device data when multiple external systems are accessing device data concurrently. The RTNDD system allows multiple external systems to be reading from a partition data structure simultaneously. The RTNDD system also allows multiple external systems to be writing to a partition data structure simultaneously so long as they are not writing to the same data element of the partition data structure. The RTNDD system uses a locking mechanism to control synchronization.

DETAILED DESCRIPTION OF THE INVENTION

Figure 1:
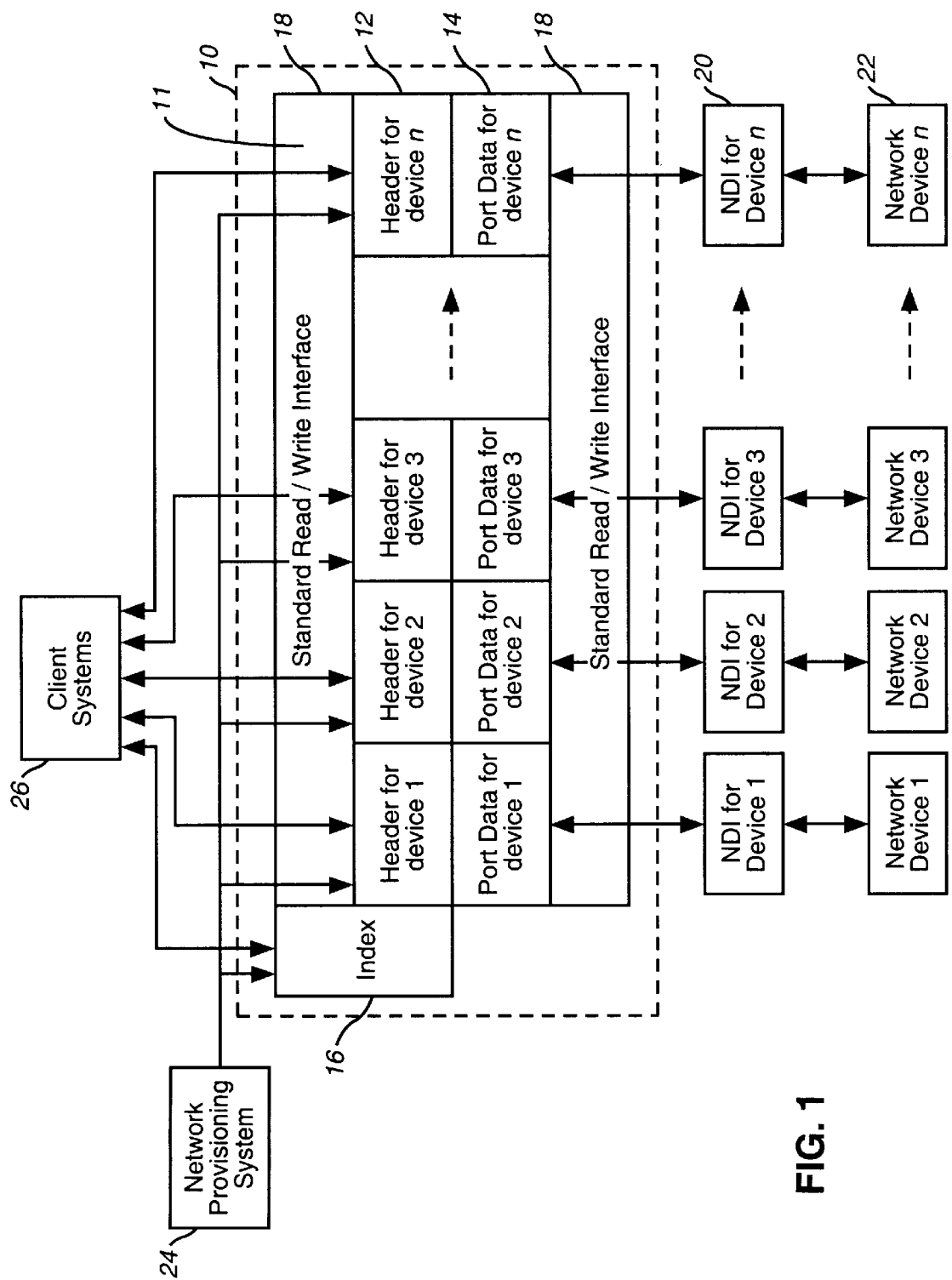
FIG. 1 is a block diagram illustrating the architecture of the RTNDD system and the external systems.

The present invention provides a Real-Time Network Device Data Management (RTNDD) system that maintains real-time data on current configuration and topology of network switching devices in a way that increases system performance and reduces development time and effort for adding new types of devices. The RTNDD system includes a memory-resident database that is accessible to external systems for reading and writing data relating to the devices in the network. The RTNDD system provides a generic interface for accessing device data, partitions data by individual devices for fast access, and organizes data elements within each partition such that multiple external systems can access data of a single device simultaneously. The external systems each execute as a separate process (on the same or a separate computer) and request services of the RTNDD through the generic interface that is a set of functions that execute within each process.

Through the generic interface provided by the Standard Interface of the RTNDD system, external systems can access the data for any type of device in a uniform manner. The RTNDD system encapsulates the data representing any type of device and allows the external systems to access the data only through the generic interface. This encapsulation of device data ensures that any changes to the device data structures or the internal architecture of the RTNDD system is transparent to external systems. Thus, the encapsulation not only reduces the time and effort needed to integrate different types of devices by eliminating the need to modify external systems, but also increases run-time performance by reducing the amount of irrelevant data that external systems need to process to perform their function.

The data stored by the RTNDD system is partitioned by the individual devices. That is, each device has its own partition, and the data for the device is stored in that partition as data elements. To allow rapid access to the partitions, the RTNDD system stores the partitions in an array. The RTNDD system provides the external systems with indexes into the array so that a partition can be rapidly accessed when an external system provides the index to the partition for the device whose data is to be accessed. Within each partition, the RTNDD system organizes the data on a port-by-port basis, which is also indexed for rapid access.

The Standard Interface of the RTNDD system coordinates access to the data for a device (i.e., a partition) to reduce synchronization problems, while at the same time ensuring real-time access to the partitions. The Standard Interface allows multiple external systems to read a partition simultaneously. The Standard Interface also allows multiple external systems to write data to a partition simultaneously. However, to prevent synchronization problems the Standard Interface does not allow a read and a write to occur simultaneously and does not allow multiple writes to the same data element to occur simultaneously. The Standard Interface provides functions for reading and writing to the partitions. The functions to read the data return the values for multiple data elements, but the functions that write the data only write a single data element at a time. The Standard Interface uses the following synchronization mechanism to reduce synchronization problems. When an external system invokes a function to read a partition, the Standard Interface determines whether any external system currently has a write lock on a data element of the partition. If there is a write lock, then the Standard Interface waits until the write lock is removed and then places a read lock on the partition. If there is no write lock on the partition (i.e., no locks or only read locks), the Standard Interface immediately places a read lock on the partition. Once the read lock has been placed, the Standard Interface reads the data of the partition and then removes the read lock. When an external system invokes a function to write a data element, the Standard Interface determines whether there is a read lock on the partition or a write lock on that data element. If either lock is present, the Standard Interface waits until the locks are removed and then places a write lock on the data element. If there is no such lock, then the Standard Interface immediately places a write lock on the data element. Once the write lock has been placed, the Standard Interface updates the data element and removes the write lock. The Standard Interface processes the requests to access a partition in the order they are received. For example, if a function to write a data element is received and an external system is currently waiting to place a read lock, then the read lock will be placed before the write lock and the external system requesting the write will wait until that read lock is removed.

The device data of the RTNDD system is generally updated by two types of external systems: the network provisioning system (NPS) and the network device interfaces (NDIs). The network provisioning system is responsible for identifying each device and setting the interconnectivity of the devices. The network device interfaces are responsible for updating the information relating to their internal configuration, including cross-connections and software versioning. The other external systems, referred to as client systems, read the data but do not update the data in the partitions.

FIG. 1 is a block diagram illustrating the architecture of the RTNDD system and the external systems. The RTNDD system 10 includes a Standard Interface 18, a partition 11 for each device, and an indexing component 16. The external systems include client systems 26, the network provisioning system (NPS) 24, and the network device interfaces (NDIs) 20 that each access the device data using the Standard Interface. The partitions are organized into an array, and each partition is divided into a Header section 12 and Port Data section 14. The Port Data section is organized as an array with a port data structure for each port of the device. The indexing component provides a mapping from the system-wide name for a device to the index of the partition for that device in the array of partitions.

Network devices may be any type of telecommunications switching device. The type of device generally depends on the application for which the RTNDD system is used. For example, if the RTNDD system is used by a real-time restoration (RTR) system, then the network devices may be Digital Cross-Connect 3/3 (DXC 3/3) devices. If the RTNDD system is used by a dynamic call setup system, then the network devices may be DXC 1/0 and DXC 1/3 devices.

An NDI is a computer application that serves as the interface between the RTNDD system and the network devices. An NDI is developed for each type of device and provides a mapping from the configuration information stored in the network device to the data stored in the partition. An NDI may execute on the same computer system as the RTNDD system or may execute on a separate computer system.

The NDIs provide many functions for the application (e.g., an RTR system) using the RTNDD system. The NDIs send commands and audit requests to the network devices. The network devices respond with audit results and confirmation of commands executed and supply unsolicited alarms to the NDIs. The NDIs then update their corresponding partition. For example, the NDI for network device 1 may send a command (e.g., received from an RTR system) to network device 1 to cross-connect port 1 to port 2. Network device 1 would then perform this cross-connect and send confirmation to the NDI for network device 1. The NDI for network device 1 would then update its partition using the Standard Interface to reflect this new cross-connect.

The RTNDD system maintains a RTNDD Header Section (not shown) that indicates the current number of partitions maintained by the RTNDD system. Each partition consists of a Header section and a Port Data section. The Header section contains data identifying the device, including an identifier code for the device, a network address, the type of device, the software version, and other pertinent data. The Header section also includes specifications for the type of communications links used by the NDI to reach the network device. The Port Data section contains port data for each port of the network device. The port data is stored in an array of port data structures with a port data structure for each port. The port data includes port type (e.g., DS-1, DS-3, OC-12), state of the port, any alarms on the port, configuration of the port, and other pertinent data. (A DS-n port is one that transmits and receives electrical signals at a certain digital bit stream rate. An OC-12 port is one that transmits and receives optical signals, in accordance with the industry standard for SONET.) The Port Data section also contains data that describes the interconnectivity of network devices. Each port data structure identifies those network devices and ports to which that port is connected. For example, if port 11 of network device 1 is connected to port 22 of network device 2, then the port data structure for port 11 of network device 1 identifies port 22 of network device 2 and vice versa.

Network devices are usually identified in the network by some code scheme. For example, a network device identifier may be a combination of a geographic location code, specific device code, and equipment type. In this scheme, if the location code of a device is AST, the specific device code is AA, and the equipment type is C (which may represent an Alcatel DXC 3/3), the device identifier may be AST_AA_C. External systems could use this device identifier when specifying which partition to access. However, the RTNDD system would need to lookup the index of the partition in the array of partitions using the indexing component each time it receives the device identifier. The RTNDD system provides a function that maps the device identifiers to their corresponding index. The external systems can use this function to find the index for a device. From then on, the external systems can use the index to identify the partition each time the partition is accessed. In this way, the overhead of mapping from device identifier to index can be minimized. Similarly, since the port data is also stored in an array, each port can also be identified by an index into the array. Thus, the port identifier can be mapped to indexes which can be used by the external systems to avoid the overhead of mapping from port identifier to index.

The client systems are applications that read the data of the RTNDD system, but do not directly update the data. These applications can include real-time restoration, dynamic call setup, and network management and monitoring systems. A client system may execute on the same or different computer as the RTNDD system. The RTNDD system may service multiple client systems simultaneously. The generalized manner in which the RTNDD represents network devices makes it possible for different client systems to use the RTNDD system for different purposes. For example, a real-time restoration system may use the RTNDD system to track the current configuration of a DXC 3/3 restoration network, while a dynamic call setup application may use the RTNDD system to track the current configuration of a DXC 1/0 and DXC 3/1 virtual private line network.

The network provisioning system (NPS) is an external system that tracks and maintains overall network topology data. The NPS stores data in its database to reflect the provisioning of the network. The NPS database may contain records that correspond to logical traffic trunks and that identify each piece of equipment traversed by a trunk. However, this organization of data does not allow for rapid access to data needed by restoration and dynamic call setup applications. These applications need to access data relating to switching devices and interconnectivity and intraconnectivity of the devices.

The RTNDD system receives selective data from the NPS that reflects the configuration and topology of the network devices that are of interest to the client systems. For example, if the RTNDD system is used by a real-time restoration system, it will receive from the NPS data that identifies the DXC 3/3 as devices, the configuration and type of each DXC 3/3, the ports of each DXC 3/3, and the interconnectivity among various DXC 3/3 devices. The RTNDD system stores this data so that it can be rapidly accessed during real-time restoration. The NPS updates the data in real-time. That is, it updates the memory-resident partition so that an update can be read immediately by client systems.

While there are two external systems that write data to the RTNDD system, each one is responsible for updating its own data elements. That is, the NPS updates certain data elements and the NPI updates other data elements. Because only one system preferably updates each data element, these systems do not have to wait while another system updates a data element. The NPS 24 initializes all data at startup of the RTNDD system, then updates such data as device type, device address, and interconnectivity among devices (i.e., which devices are connected to which devices). The NDI 20 updates port configuration data and internal connectivity within each device. This scheme ensures no conflicts among two systems writing to the same data element. Because the RTNDD system places write locks on individual data elements, both the NPS and an NDI may write simultaneously to data elements within the same partition, as long as they are different data elements. This increases system performance because one update system does not need to wait for the other update system to finish with a partition (device) before making updates to the same partition (device).

Another aspect of the RTNDD 10 that is illustrated in FIG. 1 is the use of a Standard Interface 18. The Standard Interface provides encapsulation of device data and data structure within the RTNDD system, so that devices and RTNDD internal structure are abstracted to external systems. The Standard Interface is a set of common functions that are used to read and write data of the RTNDD system. These functions generalize the structure and parameters of the data stored by the RTNDD system so that external systems do not need to know the internal structure. The Standard Interface translates requests for data reads and writes, which are submitted by external systems in a common format, to actions that are specific to the particular device type that is to receive the read or write request.

Because the external systems access the RTNDD system only through the Standard Interface, the internal structure of the RTNDD system can be changed without having to modify the external systems. Similarly, a device partition can be changed without having to modify external systems. For example, if a DXC port changes from a DS-3 port to an OC-12 port, a client system that is to read data from that port does not need to be aware of the change. The client system simply requests a read from port 9, for example, and the Standard Interface translates that request to the action that is needed for port 9, depending on the type of port.

The encapsulation provided by the Standard Interface also allows for new types of devices to be added to the RTNDD system without having to modify the external systems. For example, if the RTNDD system is setup for DXC 3/3 devices, and now a DXC 1/0 device is to be added, the client systems do not need to know a new structure or set of parameters. They use the same Standard Interface calls to read data. Also, some vendor's DXC 3/3 devices have 512 ports. Other vendor's devices have 2048 ports. If a client system requests an audit of a particular device's entire port range, it does not need to know how many ports are included, and therefore what type of device it is. The RTNDD system also abstracts the various addressing schemes used by devices. For example, a DS-3 port may be addressed by a single number (e.g., "5"), and an OC-12 port may be addressed by a triplet (e.g., "1, 1, 1"). A client system, such as an RTR system, does not need to know what particular addressing scheme is used for a port. Actual port addresses are mapped to generic port numbers (i.e., indexes) within the RTNDD system. For example, an RTR system may send cross-connect commands to network devices via the NDIs. The RTR system may send a command for network device 1 to cross-connect port 7 to port 8, without having to know what types of ports they are and what addressing scheme they use. The NDIs query the RTNDD system for the actual port address for port 7 and 8 using a Standard Interface. The RTNDD system retrieves the actual port addresses from port data structures for ports 7 and 8 and sends the port addresses to the NDI. The NDI then requests the network device to cross connect using the actual port addresses.

The following three functions are the functions of the Standard Interface for reading the data of the RTNDD system. The Standard Interface preferably places read locks not on an entire partition, but on a Header section or on an individual port. In this way, the waiting for locks to be removed can be minimized. Also, a write to the data of one port can occur simultaneously with a read to another port of the same device. The functions return all the data elements for a particular header or port.

int RTNDD_Get_Header_Data (RTNDD_leader_struct *rtndd_header_data)

This function returns all the data in the RTNDD header.

int RTNDD_Get_Device_Header_Data  (short                    device_num,
                                   Device_Header_Data_struct *device_header_data)

This function returns all data for the specified device.

int RTNDD_Get_Device_Port_Data  (short                  device_num,
                                 unsigned short         port_num,
                                 Device_Port_Data_struct *device_port_data)

This function returns all the port data for the specified port of the specified device.

The following functions are sample functions of the Standard Interface for writing data to the RTNDD system. The Standard Interface has a write function for each data element in the RTNDD Header section, the Header section, and the Port Data section. The Standard Interface places write locks on individual data elements.

int RTNDD_Set_Port_Type  (short          device_num,
                          unsigned short port_num,
                          PORT_TYPE      port_type)

This function sets the port type of the specified port of the specified device. This function is invoked by the NPS.

int RTNDD_Set_Current_Cross_Conn  (short          device_num.
                                   unsigned short port_num,
                                   int            cross_conn_index,
                                   short          current_cross_connect)

This function sets the current cross connection for the specified port of the specified device. This function is invoked by an NDI.

Figure 2:
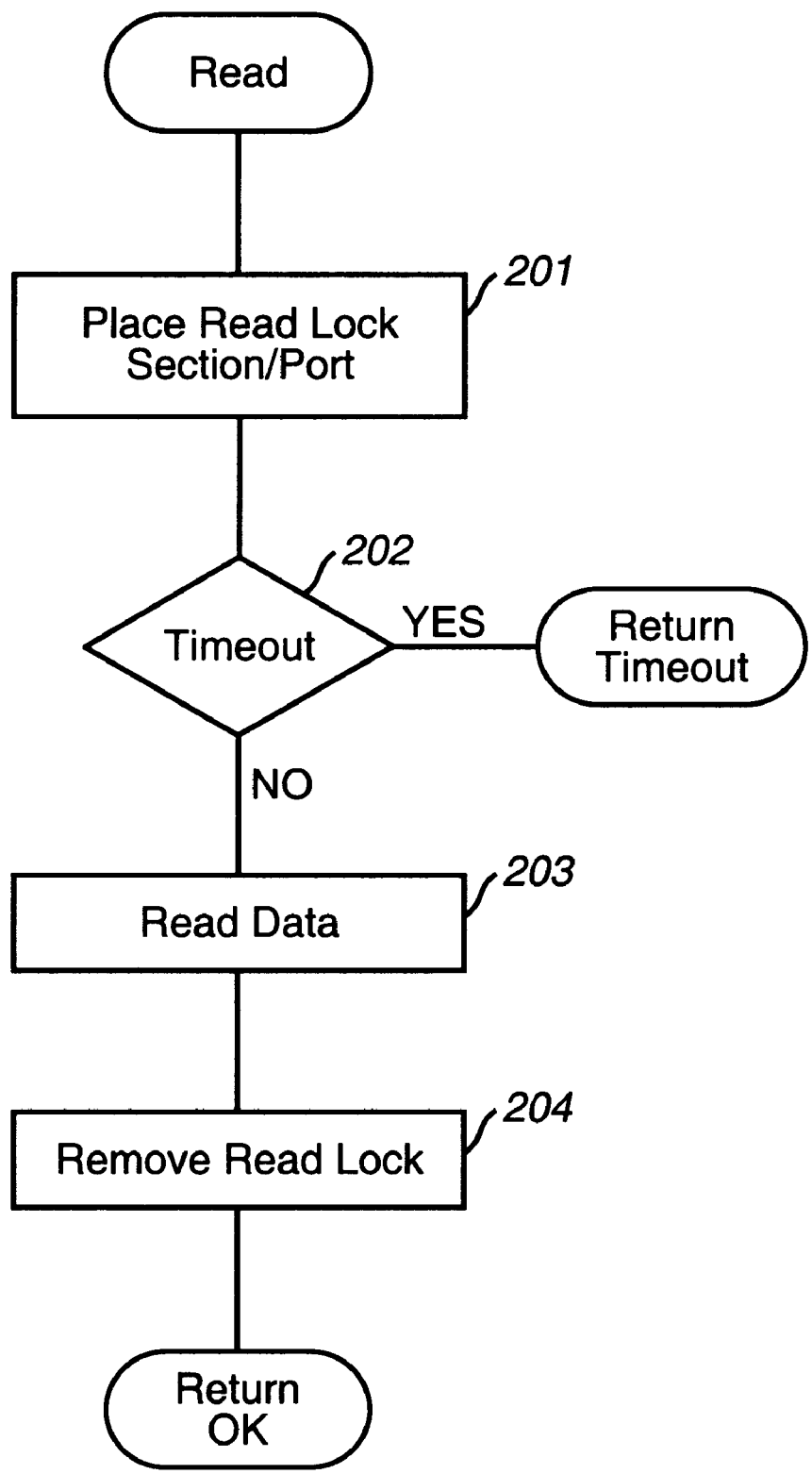
FIG. 2 is a flow diagram illustrating a read function of the Standard Interface.

FIG. 2 is a flow diagram illustrating a read function of the Standard Interface. The read functions set a lock on the appropriate section or port, read the data from that section or port, and then remove the lock. In step 201, the read function places a read lock on the section or port. The lock is not placed until no write lock is currently pending on that section or port. In step 202, if a time out occurs before the lock is placed, then the read function returns a time out indication, else the read function continues at step 203. In step 203, the read function reads all the data elements from the section or port. In step 204, the read function removes the lock from the section or port and returns an indication that the read was successful.

Figure 3:
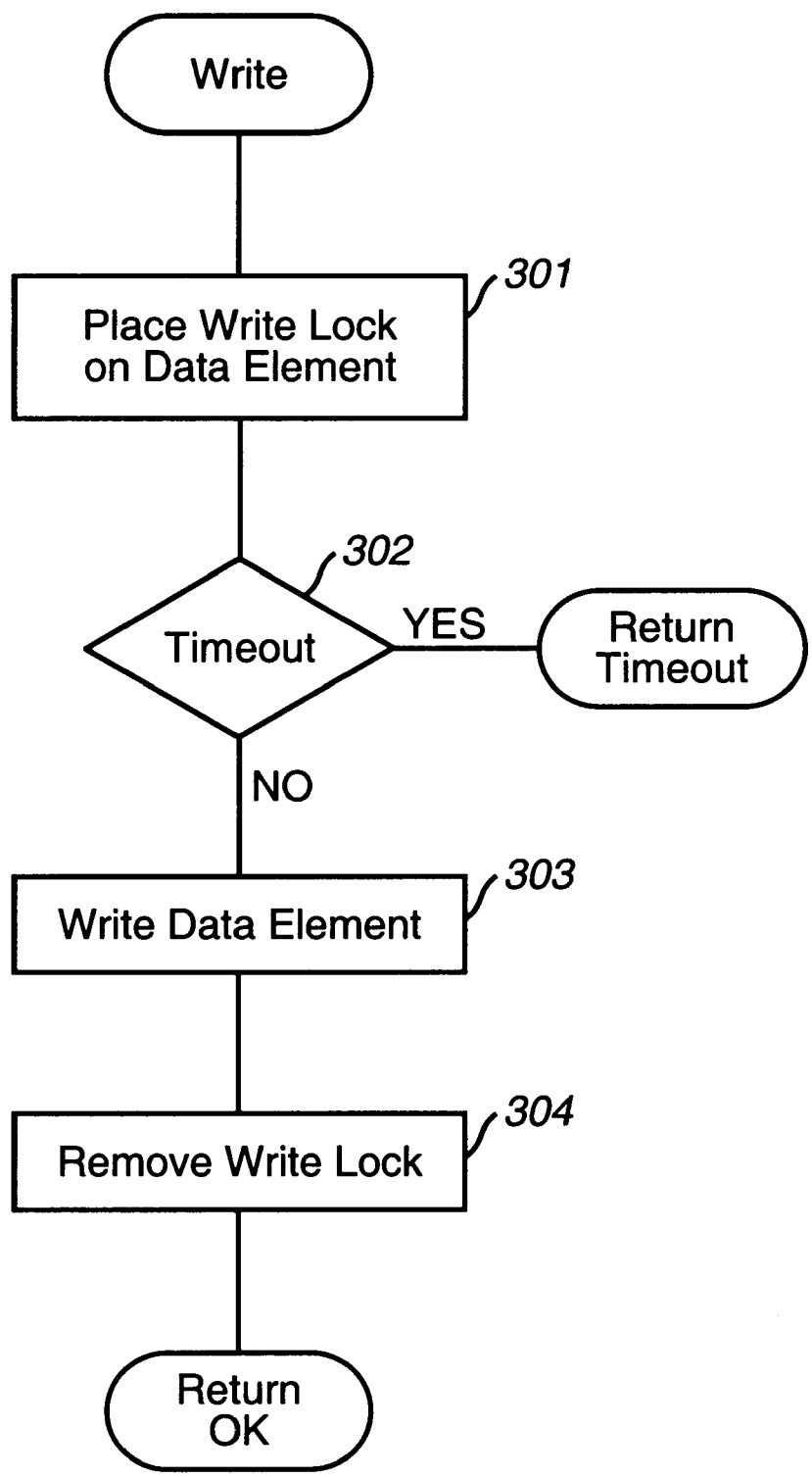
FIG. 3 is a flow diagram illustrating a write function of the Standard Interface.

FIG. 3 is a flow diagram illustrating a write function of the Standard Interface. The write functions place a lock on the individual data element to be written, write the data element, and then remove the lock from the data element. In step 301, the write function places a write lock on the data element to be updated. The write lock is not placed until all read locks have been removed from the section or port that contains the data element and until any write lock on that data element has been removed. In step 302, if a time out occurs, then the write function returns a time out indication, else the write function continues at step 303. In step 303, the write function writes the data element. In step 304, the write function removes the write lock and returns an indication that the write was successful.

Figure 4:
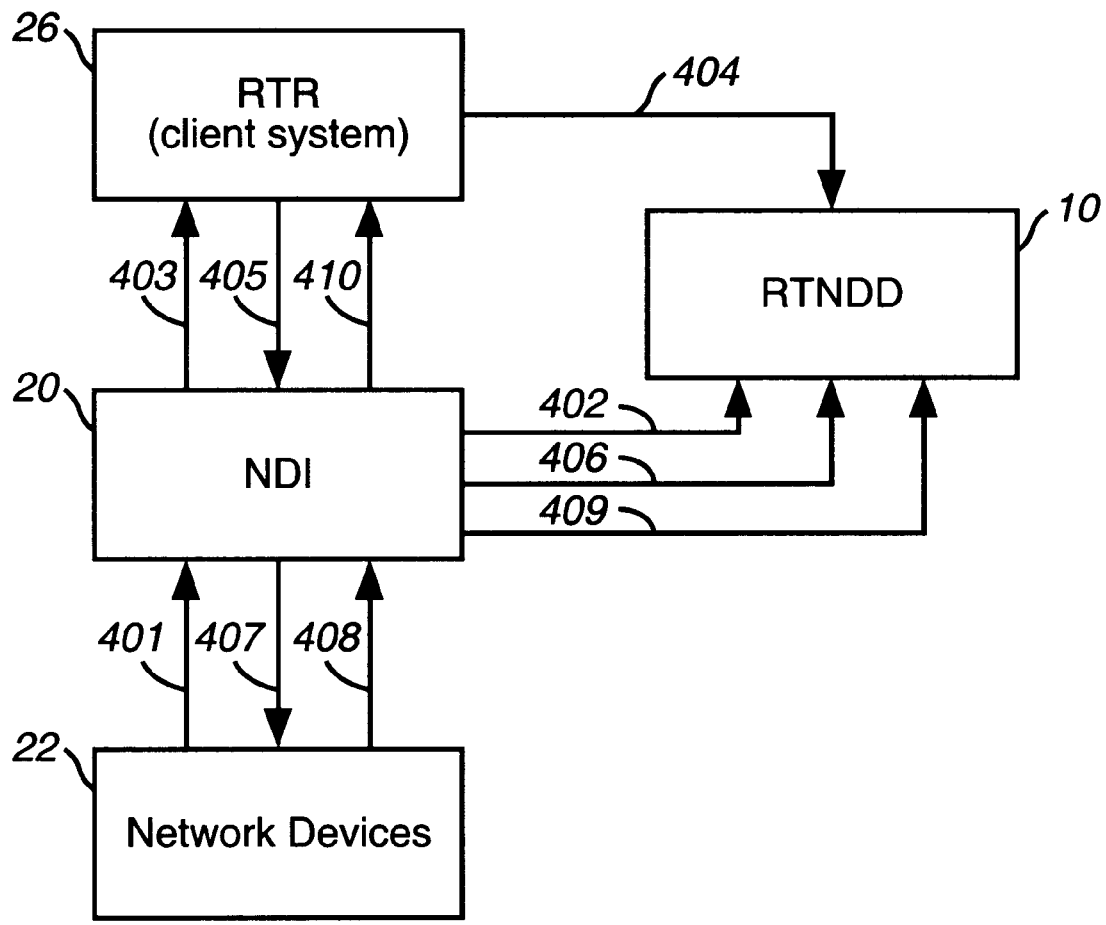
FIG. 4 is a block diagram illustrating the use of the RTNDD system by an RTR system.

FIG. 4 is a block diagram illustrating the use of the RTNDD system by an RTR system. In this example, the RTNDD system 26 is notified of a network failure by NDIs 20, and then accesses the RTNDD system 10 to determine the current configuration of the network. The RTR system identifies a restoral route to bypass the failure and sends commands to the NDIs to implement the restoral route. The NDIs send commands to the network devices 22 to implement the restoral route and also updates the RTNDD system to reflect the new configuration. The network devices generate an alarm when a failure occurs and sends 401 the alarm to the NDIs. When an NDI receives an alarm, it updates 402 the RTNDD system to indicate that an alarm has been received for a specific port of a specific device. The NDI then forwards 403 the alarm to the RTR system. The RTR system, when it receives an indication of the alarm, queries 404 the RTNDD system to determine the current state and configuration of the network devices that are either impacted by the failure or will be involved in the restoral route. The RTR system then identifies the restoral route and sends 405 commands to the NDIs to implement the restoral route. The commands identify the network devices and ports using the indexes of the RTNDD system. When the NDIs receive the commands, they query 406 the RTNDD system to determine the actual network address of the network devices and port addresses of the ports. The NDIs then send 407 the restoral route commands to the network devices. When the network devices complete processing the commands, the network devices respond 408 to the NDIs with a confirmation that the commands have been completed. The NDIs then update 409 the RTNDD system to reflect the new configuration of the network devices. The NDIs also notify 410 the RTR system that the command has been completed.

Figure 5:
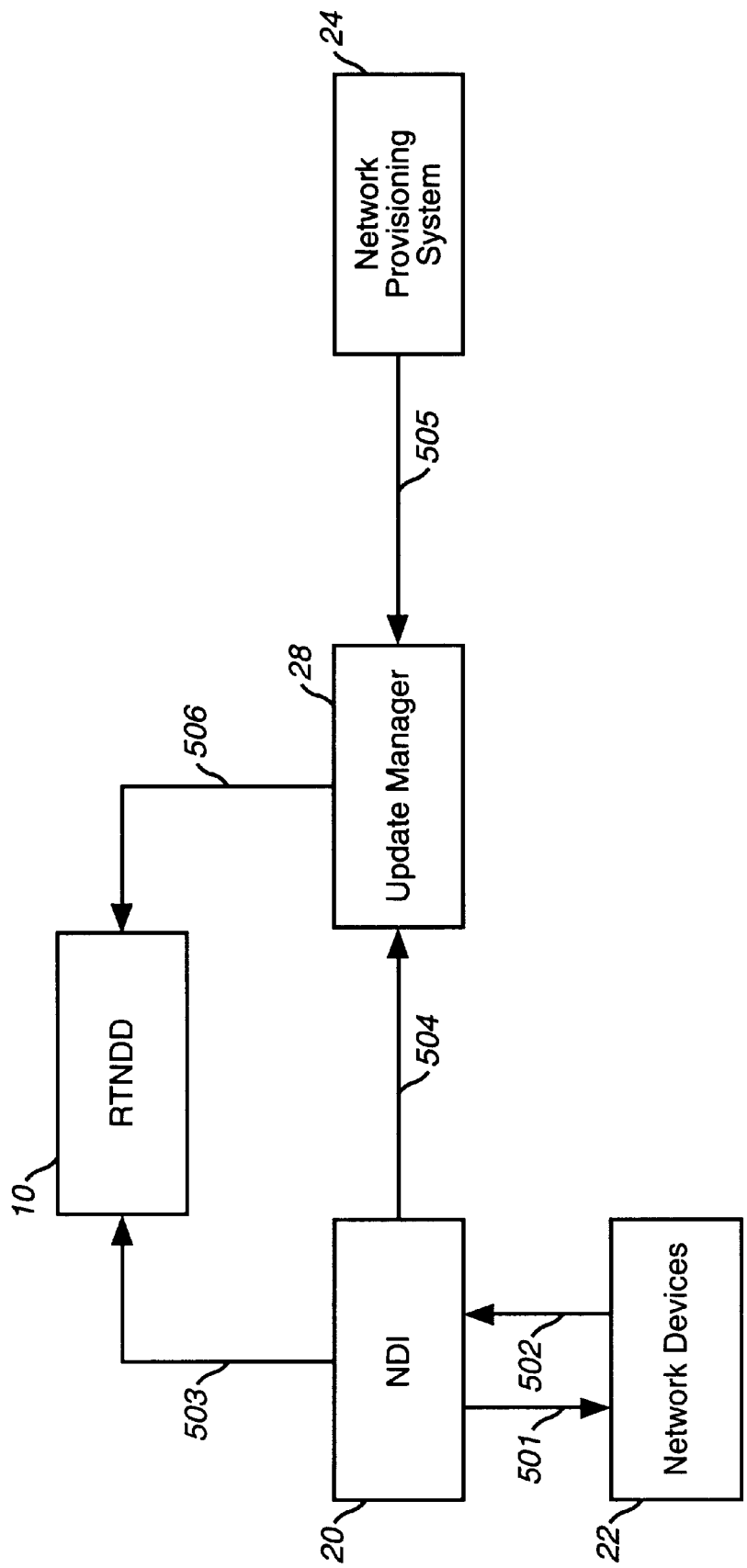
FIG. 5 is a block diagram illustrating an Update Manager that is responsible for updating the RTNDD system.

FIG. 5 is a block diagram illustrating an Update Manager that is responsible for updating the RTNDD system. The Update Manager, which is part of a client system such as an RTR system, coordinates updates to the RTNDD system. When the client system is started, the partitions of the RTNDD system 10 are loaded into memory from the NPS 24 data. The NDIs 20 then perform a routine audit of the network devices 22. This audit determines the network devices that are on line and the configuration of their ports. If the NDIs receive an audit response that reflects a configuration that is different than what is stored in the RTNDD system, the NDIs notify the Update Manager 28 so that the inconsistent states can be resolved. On startup, the NDIs issue 501 an audit request to the network devices. The network devices responds 502 with an audit of their ports. The NDIs then update 503 the RTNDD system with the data from the audit. The NDIs also check the data elements for which the NPS is responsible for updating. If that data element does not accurately reflect the audit, the NDI notifies 504 the Update Manager that data elements for which the NPS is responsible require updating. The NPS notifies 505 the Update Manager of updates to the network topology. The Update Manager updates 506 the RTNDD system based on information provided by the NDIs and the NPS. The Update Manager updates the RTNDD system based on whether the NDIs are to override the NPS, or vice versa.

The following tables describe the data elements of the RTNDD Header section, the Header section, and Port Data section.

| RTNDD HEADER | |
| --- | --- |
| NAME | DESCRIPTION |
| Maximum potential devices | The maximum possible number of devices. |
| Maximum configured devices | The actual number of configured devices. |
| Start of Header sections | Starting index, lookup table, jump table, or other data structure to allow the Standard Interface to know the starting address. |

| DEVICE HEADER | |
| --- | --- |
| NAME | DESCRIPTION |
| Device entry status | Indicates the presence or absence of valid data within this partition. |
| Station Code | MECCA/RTT provided station code |
| Equipment Code | MECCA/RTT provided equipment code |
| Device Specifier Structure | The Station Id, the Equipment alpha, and the equipment id strings. |
| Station id | MECCA/RTT provided station name |
| Equip Alpha | MECCA/RTT provided equip alpha |
| Equip Id | MECCA/RTT provided equipment id |
| Active Links | Indicates which of the two binary links (in the Binary Link Specification Structure) contains valid data and should be used by the NIFTE to establish communication to the device. |
| Binary Link Specification Structure | The complete specification and status for a binary links. There is a Binary Link Specification structure for each binary link. |
| Network Name | The name of the network to utilize for this binary link |
| NIS Name | The name of the Network Interface Device, (DECNIS, or Switch) to which X.25 Calls are made. |
| Local DTE Address | Local DTE address on host side. |
| Direct Connect | Indicates whether the connection is made directly or through a remote interface. |
| Remote DTE Address | Remote DTE address on target side. |
| Number of Virtual Links | Number of virtual links for this binary link. |
| Virtual Link Specification Structure | The specification for each virtual link as well as the link's current state and status. |
| Virtual Link Type | Virtual link type name. |

-continued

DEVICE HEADER

| NAME | DESCRIPTION |
| --- | --- |
| Virtual Link Status | The current status of the link. |
| Virtual Link State | The current state of the virtual link. |
| Permanent Virtual Circuit (PVC) Number | A unique number that identifies the PVC. |
| Number of Connect Attempts | Number of connection attempts that have been made since the last successful connection. |
| Maximum Device Port Used | The maximum numerical device port # value which would be "of interest to" a real-time restoration system. "Of interest to" means that it is TRAFFIC_BEARING or SPARE. PROTECTED or NOT_PROVISIONED ports are not included in the calculation of this value. |
| Maximum Device Port Capacity | The maximum possible number of ports. |
| Maximum Device Port Number In Use | The maximum numerical device port # value which would be of interest to a real-time restoration system. |
| Device Node Id | This value contains the device node number assigned by the real-time restoration system. Note that for DSC device, the max value is 255, whereas for Alcatel devices, the max value is 65535. |
| Is NIFTE Running Flag | This value is set by the NIFTE as soon as it starts running, and is turned off by the NIFTE when it terminates. |
| Start Of Elements For This Device | Location of port data structures. |

DEVICE PORT DATA

| NAME | DESCRIPTION |
| --- | --- |
| Port provisioning | Indicates how the port has been provisioned by field engineers. |
| RTR allocation status | The current status of the port as determined by the Route Generator. This value is only read and written by Route Generator. |
| Port Type | The hardware facility type for which this port is configured |
| Port Address | Actual device port address. |
| Signal clocking | The type of signal clocking used by the trunk; DS3's are always ASYNC, ECls can be SYNC or ASYNC. |
| Provisioned cross connection | The device internal port cross connection. |
| Number of Broadcast Ports | Indicates whether this port is internally cross connected to 0, 1, or 2 other ports. This value serves as an index though the API to look up the actual cross-connect values. |
| Current cross connection | The device internal port cross connection. |
| Remote end Device # | The remote device number to which this port and trunk are connected. |
| Remote end Device port # | The remote port number to which this port and trunk are connected. |
| Last Alarm Update | The last time that this port was updated with alarm data. |
| Last Configuration Update | The last time that this port was updated with configuration data. |
| Last Connect Update | The last time that this port was updated with connect data. |
| Port Alarm State | The current alarm state of the port. |
| Break ID | The event of a preplan, or a RTR Route Generator assigned Break Id in the event of Dynamic route generation. |

-continued

DEVICE PORT DATA

| NAME | DESCRIPTION |
| --- | --- |
| Trunk ID | The MECCA assigned trunk id for the trunk which connects to this port. |
| Trunk Priority | Relative importance of the trunk as it pertains to restoration. Restoration will be attempted on trunks with higher priority before trunks with lower priorities. |
| Port Configuration State | The port configuration state as the Device knows it. |

Although the present invention has been described in terms of a preferred embodiment, it is not intended that the invention be limited to these embodiments. Modifications within the spirit of the invention will be apparent to those skilled in the art. The scope of the present invention is defined by the claims that follow.

What is claimed is:

1. A system for accessing data describing a plurality of network devices, comprising:

a data structure containing data describing each of the plurality of network devices, each network device having a network device type;

wherein the data structure has one partition for each network device, wherein the partitions are stored in an array, and wherein each partition is identified by an index into the array and wherein each network device has ports and each partition has a header section for storing data that is not port specific and a port data section for storing data describing the ports;

a standard interface for providing a common mechanism for accessing the data structure to read and write the data describing the network devices;

a plurality of external systems that use the standard interface to access the data describing the network devices; and whereby data describing network devices of new types can be added to the data structure and accessed by the external systems without modify the external systems.

2. The system of claim 1 wherein the standard interface provides a mapping between generic port addresses to actual addresses used by the network devices.

3. The system of claim 1 wherein the standard interface provides functions for reading and writing the data and wherein the external systems invoke these functions to access the data.

4. The system of claim 1 wherein the standard interface allows multiple external systems to be simultaneously reading data for the same network device and allows multiple external systems to be simultaneously writing data for the same network device.

5. The system of claim 1 wherein the data structure is stored in primary storage of a computer system for rapid access by external systems.

6. The system of claim 1 wherein each data element of the data is updated by only one external system to minimize waiting when updating the data.

* * * * *